US009529763B2

(12) United States Patent
Levy et al.

(10) Patent No.: US 9,529,763 B2
(45) Date of Patent: Dec. 27, 2016

(54) SENSOR SYSTEMS AND METHODS UTILIZING ADAPTIVELY SELECTED CARRIER FREQUENCIES

(71) Applicant: Infineon Technologies AG, Neubiberg (DE)

(72) Inventors: David Levy, Wernberg (AT); Harald Witschnig, Landskron (AT); Dirk Hammerschmidt, Villach (AT); Wolfgang Scherr, Villach/Neulandskron (AT); Andrea Morici, Villach (AT)

(73) Assignee: Infineon Technologies AG, Neubiberg (DE)

( * ) Notice: Subject to any disclaimer, the term of this patent is extended or adjusted under 35 U.S.C. 154(b) by 686 days.

(21) Appl. No.: 13/933,652

(22) Filed: Jul. 2, 2013

(65) Prior Publication Data

US 2015/0012678 A1 Jan. 8, 2015

(51) Int. Cl.
*G06F 13/42* (2006.01)
*G06F 13/38* (2006.01)

(52) U.S. Cl.
CPC ............. *G06F 13/42* (2013.01); *G06F 13/385* (2013.01)

(58) Field of Classification Search
CPC ..... G06F 13/385; G06F 13/42; G06F 13/4282
See application file for complete search history.

(56) References Cited

U.S. PATENT DOCUMENTS 5,128,625 A 7/1992 Yatsuzuka et al.
6,243,004 B1 * 6/2001 Flick ....................... B60R 16/03 180/287
6,411,075 B1 6/2002 Battiston et al.
6,563,761 B1 5/2003 Schaffran et al.
6,959,356 B2 * 10/2005 Packwood et al. ..... H04L 69/18 700/1
7,289,637 B2 10/2007 Montag et al.
7,304,401 B2 * 12/2007 Enders et al. ...... B60R 16/0315 307/10.1
7,349,347 B2 * 3/2008 Yanagida et al. ...... H04B 3/548 370/252
7,454,170 B2 * 11/2008 Goossens et al. ..... G08C 17/04 455/41.1
7,725,096 B2 * 5/2010 Riveiro et al. ......... H04B 3/542 307/2
7,783,260 B2 8/2010 McCallister et al.
7,920,585 B2 4/2011 Mizutani
7,978,600 B2 * 7/2011 Itabashi et al. ..... H04L 12/4135 370/229

(Continued)

OTHER PUBLICATIONS

U.S. Appl. No. 14/022,728, filed Sep. 10, 2013. 25 Pages.

(Continued)

*Primary Examiner* — Brian Misiura

(74) *Attorney, Agent, or Firm* — Eschweiler & Associates, LLC

(57) ABSTRACT

A sensor system utilizing adaptively selected carrier frequencies is disclosed. The system includes a system bus, a bus master, and a sensor. The system bus is configured to transfer power and data. The bus master is coupled to the system bus and is configured to provide power to the bus and receive data from the bus. The sensor is coupled to the system bus and is configured to transfer data on the bus using an adaptively selected carrier frequency.

15 Claims, 8 Drawing Sheets

(56) References Cited

U.S. PATENT DOCUMENTS

| | | | | |
|---|---|---|---|---|
| 8,428,154 | B2 * | 4/2013 | Ishiko | H04B 3/544 375/257 |
| 8,478,212 | B2 * | 7/2013 | Moon et al. | H01Q 1/248 375/295 |
| 8,990,464 | B2 * | 3/2015 | Kessler | G06F 13/4295 710/104 |
| 9,042,295 | B1 * | 5/2015 | Balter | H04B 7/18515 370/317 |
| 2011/0064126 | A1 * | 3/2011 | Ishiko | H04B 3/544 375/222 |
| 2011/0086606 | A1 | 4/2011 | Chen et al. | |
| 2012/0140793 | A1 | 6/2012 | Demessie et al. | |
| 2012/0300823 | A1 | 11/2012 | Petrovic | |
| 2015/0009256 | A1 | 1/2015 | Bildstein et al. | |
| 2015/0012767 | A1 * | 1/2015 | Levy et al. | G06F 1/324 713/322 |
| 2015/0071369 | A1 * | 3/2015 | Levy et al. | H04L 27/148 375/272 |
| 2015/0318694 | A1 * | 11/2015 | Stevens | H02J 1/00 307/52 |

OTHER PUBLICATIONS

Final Office Action Dated May 22, 2015 U.S. Appl. No. 14/022,728.
Non Final Office Action Dated Dec. 4, 2015 U.S. Appl. No. 14/022,728.
Non Final Office Action Dated Dec. 24, 2014 U.S. Appl. No. 14/022,728.
Final Office Action Dated May 9, 2016 U.S. Appl. No. 14/022,728.
Notice of Allowance Dated Oct. 5, 2016 U.S. Appl. No. 14/022,728.

* cited by examiner

SENSOR SYSTEMS AND METHODS UTILIZING ADAPTIVELY SELECTED CARRIER FREQUENCIES

BACKGROUND

Automotive systems are complex systems that include computers and components to operate and monitor automotive vehicles. The systems typically include a processor that controls and monitors engine operation and the like. The system generally operates various control systems that perform automotive functions. By monitoring, minor problems can be identified and corrected before becoming major problems.

Automotive systems typically use a dual purpose bus to mitigate wiring and cost. The bus provides power to sensors and components and also is used for data transmission. Generally, attempts to improve providing of power degrade data transmission and, similarly, attempts to improve data transmission degrade providing of power.

DETAILED DESCRIPTION

Figure 1:
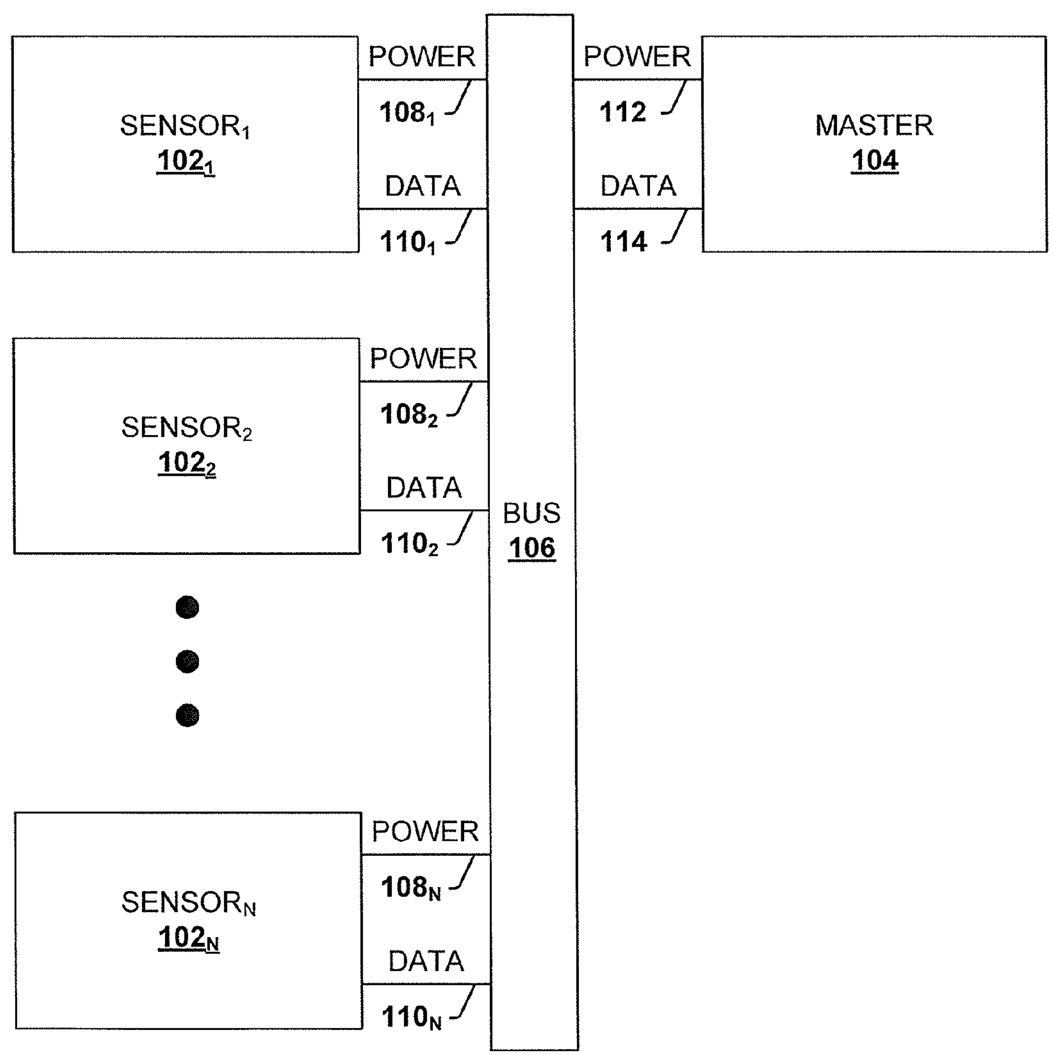
FIG. 1 is a diagram illustrating a sensor system that uses modulation for data transmission.

The present invention will now be described with reference to the attached drawing figures, wherein like reference numerals are used to refer to like elements throughout, and wherein the illustrated structures and devices are not necessarily drawn to scale.

Systems and methods are disclosed that facilitate automotive systems and related systems. The communication between components, such as sensors and controllers, is facilitated by modulating communications or data transmission to selected frequencies.

FIG. 1 is a diagram illustrating a sensor system 100 that uses modulation for data transmission. The system 100 can be used for automotive systems and the like. A modulation technique at an adaptively selected carrier frequency is utilized for data transmission to enhance data rates and mitigate power consumption.

The system 100 includes a plurality of sensors 102, a system interface or bus 106 and a bus master component 104. The master component 104, also referred to as the master side or bus master, provides power 112 and transfers data 114. The power 112 is provided according to selected levels that typically correspond to a particular protocol, such as an automotive protocol. The master component 104 can be configured to only receive data or can be bidirectional, and send and receive data. The master component 104 is configured to demodulate received data 114 in order to extract the demodulated data.

The received data 114 is at a first carrier frequency and is demodulated using a modulation technique agreed by and known to both the master and the sensor. Additionally, the master component 104 can be configured to modulate transferred data 114. The transferred data 114 is modulated using a second modulation technique agreed by and known to both the master and the sensor, which can be the same as the first modulation technique. The modulation technique requires a carrier frequency an order of magnitude greater than the data rate transmission. The master component 104 can be configured to perform clock and data recovery, for received data 114 without a clock signal. The sensor component 102 can be configured to perform clock and data recovery, for received data 110 without a clock signal.

Some examples of suitable modulation techniques that can be utilized for the first and second modulation techniques include binary phase shift keying (BPSK), quadrature amplitude modulation (QAM), phase shift keying (PSK), and the like. Additionally, the suitable modulation technique includes adaptive modulation wherein varied channels or frequencies can be identified to facilitate transmission. Thus, for example, a noisy channel is not used.

The system bus 106 is configured to transfer data and power. The system bus is arranged with a suitable number of wires and types of wires. In one example, the system bus 106 includes a pair of wires that are used for transferring data and power. In another example, the system bus includes three wires, wherein a first and second wire are used to transfer power and the first and a third wire are used to transfer data.

The plurality of sensors 102 includes a first sensor $\mathbf{102}_1$, a second sensor $\mathbf{102}_2$, to an Nth sensor $\mathbf{102}_N$ and are collectively designated as the sensors 102. The sensors 102 each receive power $\mathbf{108}_1$, $\mathbf{108}_2$, to $\mathbf{108}_N$, collectively designated as 108. The power 108 is received from the system bus 106.

Further, the sensors provide or transfer data $\mathbf{110}_1$, $\mathbf{110}_2$, to $\mathbf{110}_N$) which are collectively designated as 110. The provided data 110 is modulated according to the first modulation technique and at the first carrier frequency. The transfer data 110 is provided to the system bus 106, after modulation. The sensors 102 can also receive data 110 from the system bus 106, which can include control information and the like. The received data 110 is demodulated according to the second modulation technique.

In one example, the bus master component 104 is configured to adaptively select the carrier frequencies used by the sensors 102 and the bus master 104. A list of available channels are identified and analyzed to identify a channel suitable for data transfer using the system bus 106.

Figure 2:
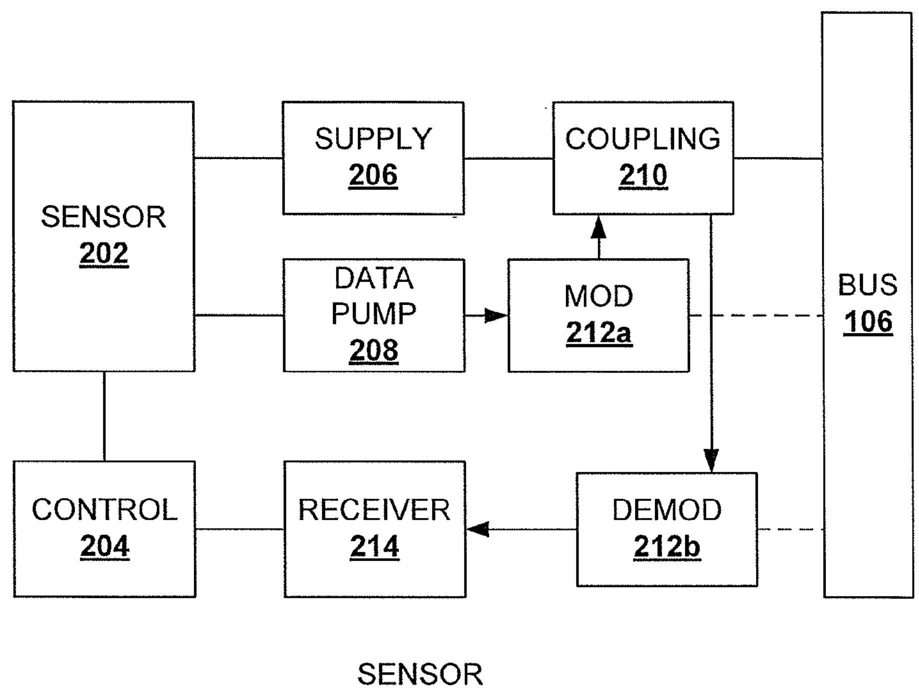
FIG. 2 is a block diagram illustrating a sensor system configured to provide modulated data at an adaptively selected carrier frequency.

FIG. 2 is a block diagram illustrating a sensor system 200 configured to provide modulated data at a selected carrier frequency. The sensor 200 provides data or information using relatively low power levels.

The system 200 includes a sensor 202, a control component 204, a power supply 206, a data pump 208, a modulation component 212, a coupling component 210 and a receiver 214. The modulation component 212 is shown as a modulation component 212*a* for outgoing or transmitting information and a demodulation component 212*b* for incoming or receiving information. The sensor 202 provides sensor measurements for one or more characteristics. The measurements can include information such as temperature, pressure, vibration, rotation, magnetic field measurements, and the like. The measurements can be related to tire pressure, antilock brake systems and the like. The sensor 202 provides the sensor measurements to the data pump 208. Additionally, the sensor 202 receives power from the supply component 206.

The sensor 202 is operated by the control component 204. The sensor 202 can be controlled to take measurements, determine type of measurements to obtain, perform actions, and the like. The control component 204 is also configured to initiate a change in carrier frequency. The change is initiated using a suitable mechanism, such as being initiated by a master bus component also coupled to the bus 106, an automatic switch based on a pseudorandom mechanism synchronous to the master, and the like.

The supply component 206 provides the power to the sensor 202. The supply component 206 obtains the power from a decoupled power signal provided by the coupling component 210. The supply component 206 may filter or modify the decoupled power signal before providing it as the power to the sensor 202.

The coupling component 210 decouples a bus signal from the system bus 106. In an incoming direction, the coupling component 210 decouples the bus signal into the decoupled power signal and a decoupled data signal.

The modulation component 212, which includes 212*a* and 212*b*, is configured to perform modulation and demodulation of signals. For outgoing data transfer, the modulation component 212*a* modulates a pumped data signal from the data pump 208 using a selected carrier frequency into a modulated sensor measurement signal. The carrier frequency utilized is typically 5 or more times higher than the data bandwidth. In another example, the carrier frequency utilized is typically 10 or more times higher than the data bandwidth.

For incoming data transfer, the demodulation component 212*b* demodulates the decoupled data signal into a received data signal. The demodulation component 212*b* utilizes an incoming modulation technique, which corresponds to a modulation technique used to modulate the data. The incoming modulation technique may also be the modulation technique utilized for outgoing data transfer. The demodulation component 212*b* can perform clock and data recovery. The demodulation component 212*b* may perform itself the clock and data recover or utilize a separate clock and data recover component.

The receiver 214 receives the received data signal and can perform processing on the received data signal prior to providing the received data signal to the control component 204. This may include error checking mechanism, address matching and the like.

It is appreciated that variations in the above components are contemplated. In one example, the modulation component 212*b* obtains the data signal directly from the bus 106 without using the coupling component 210 to decouple it from the power signal. Additionally, in another example, the modulation component 212*a* provides the modulated data measurement signal directly to the bus 106 without using the coupling component 210.

Figure 3:
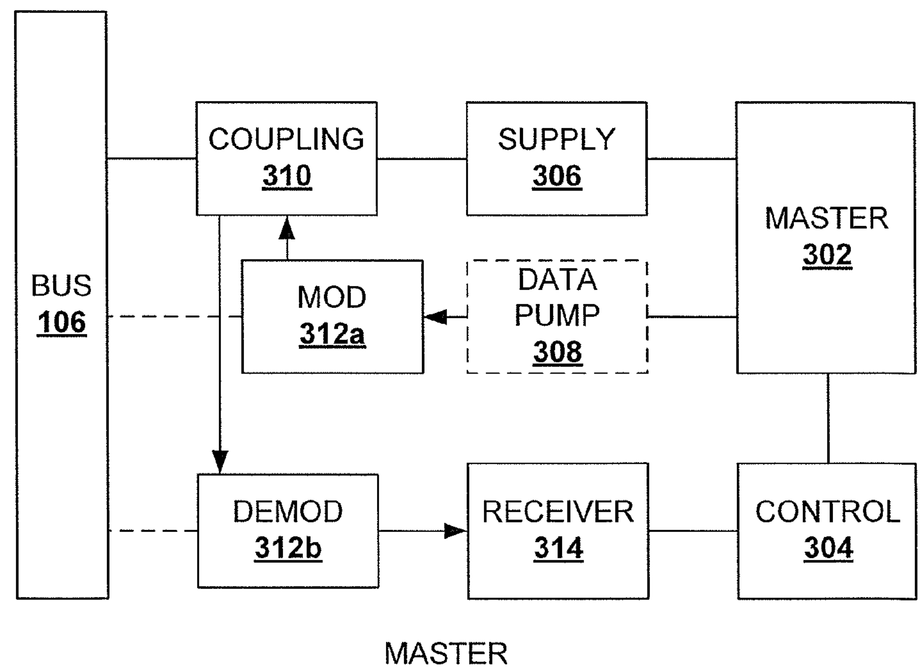
FIG. 3 is a block diagram illustrating a master bus system configured to transfer modulated data at an adaptively selected carrier frequency.

FIG. 3 is a block diagram illustrating a master bus system 300 configured to transfer modulated data at an adaptively selected carrier frequency. The master 300 transfers data or information using relatively low power levels while also providing power. The provided power can be utilized by other components, such as sensors and the like.

The system 300 includes a bus master 302, a control component 304, a power supply 306, an optional data pump 308, a modulation component 312, a coupling component 310 and a receiver 314. The modulation component 312 includes a modulation portion or component 312*a* and a demodulation portion or component 312*b*. The bus master 302 may generate control information, configuration information, and the like and provide the information as a master signal. The master 302 is operated by the control component 304.

In addition to generating the master signal, the master 302 controls the power supply 306. The power supply 306 is regulated to generate bus power with suitable characteristics, such as voltage level, current, frequency range, and the like. The bus master 302 can also receive information via the control component 304 from the receiver 314.

The data pump 308 drives or pumps the master signal into a pumped data signal. The pumped data signal is modulated by the modulation component 312. The modulation component 312 is configured to perform modulation and demodulation of signals. For outgoing information or configuration transfer, the modulation component 312*a* modulates the pumped signal from the data pump using an agreed upon outgoing modulation technique and an adaptively selected carrier frequency. The signal is provided as a modulated master signal. The carrier frequency utilized is typically 5 or more times higher than the data bandwidth. Further, the carrier frequency is adaptively selected by analyzing available channels and selecting a suitable channel and carrier frequency that yields suitable characteristics. These include an error count below a threshold value. The available channels can include a currently used channel.

For incoming data transfer, the modulation component 312 demodulates a decoupled data signal into a received data signal. The modulation component 312 utilizes an incoming modulation technique, which corresponds to a modulation technique used to modulate the data. The incoming modulation technique may also be the modulation technique utilized for outgoing data transfer.

The receiver 314 receives the received data signal and can perform processing on the received data signal prior to providing the received data signal to the master component 302.

In an outgoing direction, the coupling component 310 is configured to combine the bus power with the modulated master signal and provide a coupled signal to the bus 106. The coupling component 310 is also configured to decouple a bus signal from the system bus 106. In an incoming direction, the coupling component 310 decouples the bus signal into a decoupled data signal.

It is appreciated that variations in the above components are contemplated. In one example, the modulation component 312 provides the data signal directly to the bus 106 without using the coupling component 310.

Figure 4:
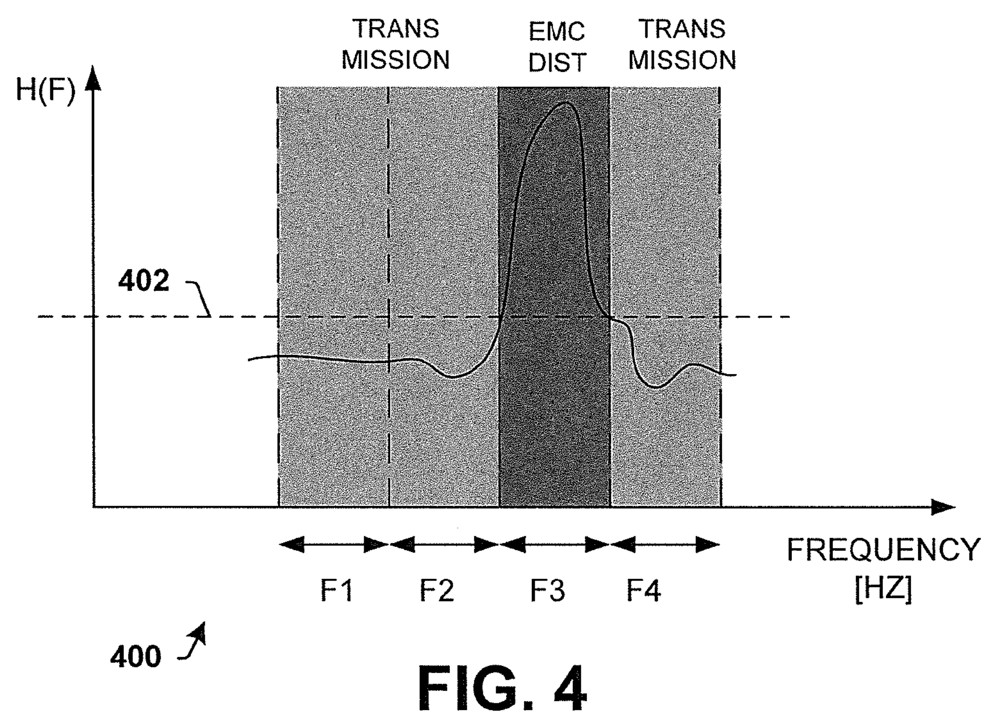
FIG. 4 is a graph depicting an example frequency spectrum for an automotive communication system.

FIG. 4 is a graph 400 depicting an example frequency spectrum for an automotive communication system. The graph 400 is provided as an example to illustrate adaptively selecting channels for data transfer and modulation. It is appreciated that the graph 400 is provided as an example and that other channels and/or frequency spectrums can be utilized.

An x-axis depicts frequency and a y-axis depicts signal distortion magnitude H across the frequency spectrum. Here, there are four channels depicted, F1, F2, F3, and F4. It can be seen that channels F1, F2 and F4 have relatively low distortions and are below a threshold 402. However, the channel F3 has a relatively large amount of distortion present that exceeds the threshold 402. As a result, the channel F3 is deemed not suitable for data transfer.

Over time, the distortions or noise present in the channels can vary. Thus, distortion measurement and analysis can be performed again, over time to reevaluate the channels.

Figure 5:
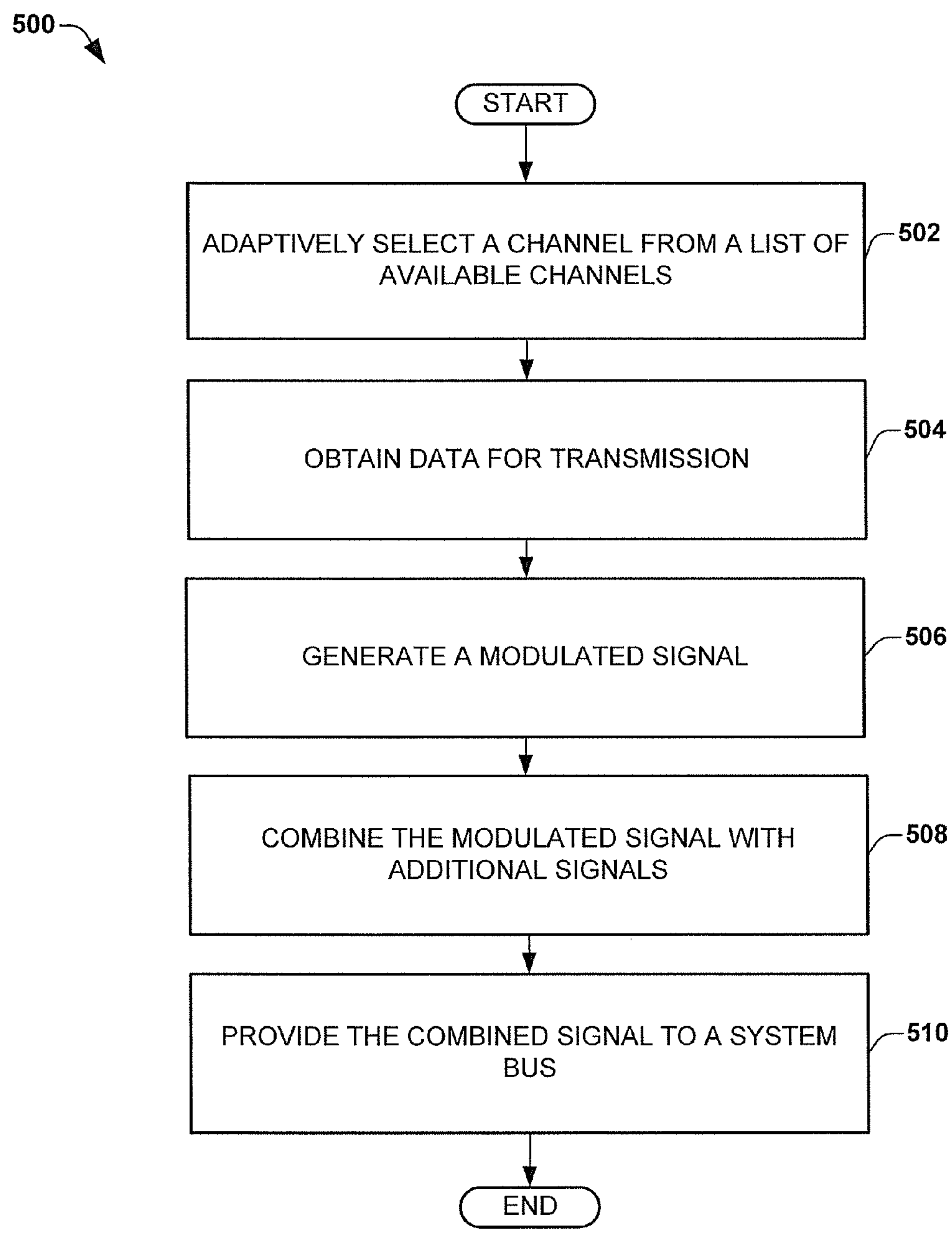
FIG. 5 is a method for communicating over a bus using modulation and adaptively selected channel(s).

FIG. 5 is a method 500 for communicating over a bus using modulation and adaptively selected channel(s). The method 500 can be utilized for automotive systems and the like. The modulation technique at an adaptively selected carrier frequency is utilized for data transmission to enhance data rates and mitigate power consumption.

The method begins at block 502, where a channel is selected from a list of available channels. The selection of the channel is performed pseudo-randomly from the set of allowed channels.

Data is obtained for transmission at block 504. The data or information can be obtained from automotive sensors, vibration sensors, temperature sensors, controllers, and the like. As described above, the data/information can be from a sensor, a bus master, controller, and the like. The information can include control information, measurements, data, and the like. In one example, the information includes automotive measurements, such as tire vibration.

A modulated signal is generated for the data at block 506 using the modulation technique and the selected channel. The signal is modulated using a carrier frequency associated with the selected channel. The signal includes data or information to be modulated and transmitted.

The modulated signal is combined with additional signals at block 508 to generate a combined signal. The additional signals can include a regulated power signal, a preamble for clock recovery, other communication signals, non-modulated signals, and the like. A coupler or similar component can be utilized to combine the modulated signal with the additional signals. It is appreciated that some variations of the method 500 omit combining the signal with the additional signals.

The combined signal is provided to a system bus at block 510. The combined signal includes the modulated signal and typically complies with bus requirements. The bus requirements may include upper and lower voltage limits, upper and lower current limits, power limits, frequency ranges, and the like.

The combined signal can be utilized for power and data transfer by other components connected to the system bus.

It is appreciated that the method 500 can be utilized by multiple components, such as sensors, coupled to the bus. For example, full duplex communication permits multiple components to provide the data on the bus at the same time. A master or other component would need multiple receivers or be configured another way to receive the multiple communications at the same time. Additionally, each sensor and/or component transmitting on the bus utilizes a different carrier frequency.

Figure 6:
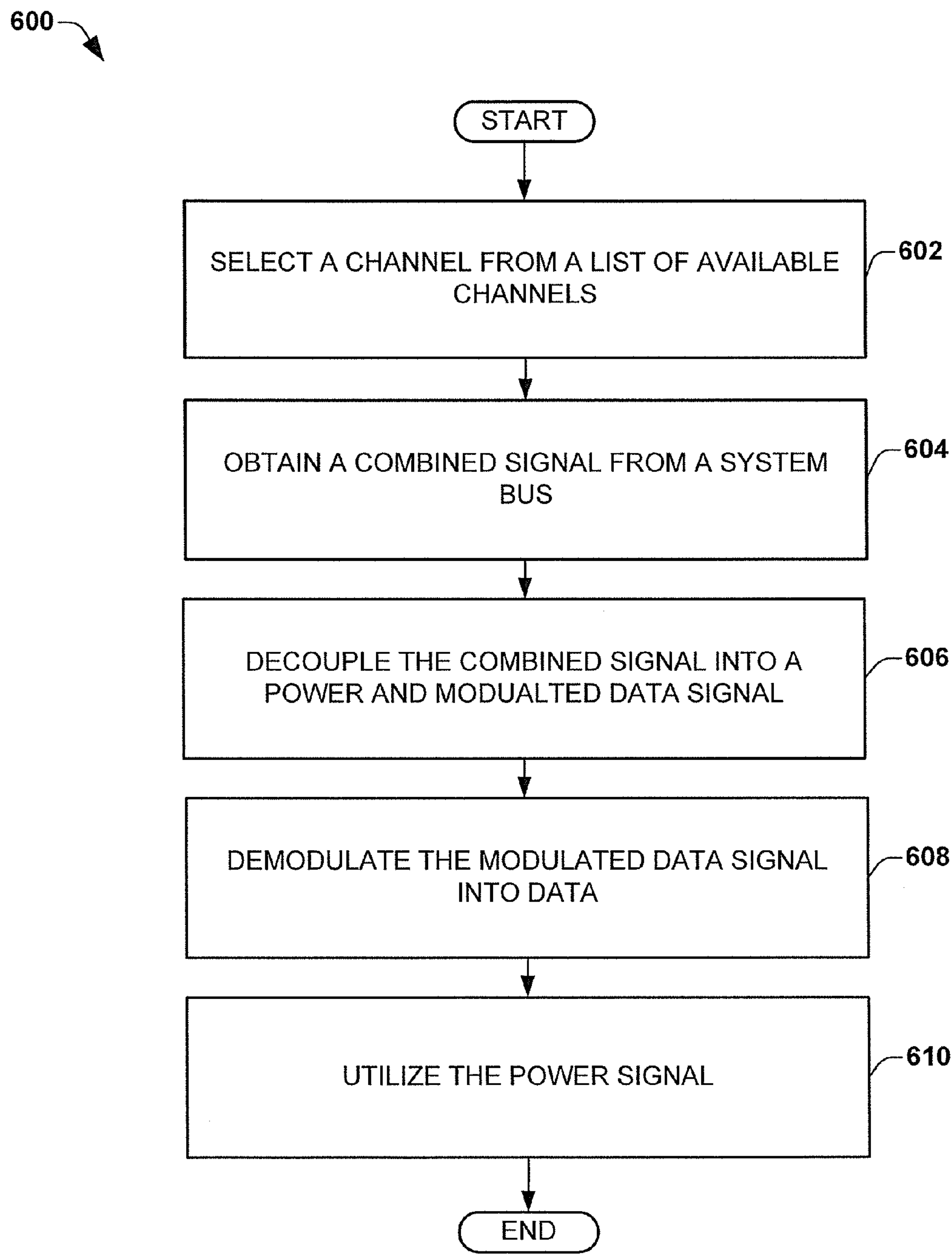
FIG. 6 is a method for receiving data and power over a system bus using modulation and adaptively selected channel(s).

FIG. 6 is a method 600 for receiving data and power over a system bus using modulation and adaptively selected channel(s). The method 600 can be utilized for automotive systems and the like.

The method begins at block 602, where a channel is identified from a list of suitable channels for data transfer. The master changes the channel at fixed points in time, agreed by the sensor. The channel change is done synchronously at the master and sensor side. Both switch to the same channel.

Some examples of suitable modulation techniques include, binary phase shift keying (BPSK), quadrature amplitude modulation (QAM), phase shift keying (PSK), and the like. It is appreciated that other modulation techniques can also be utilized.

A combined signal is obtained from a system bus at block 604. The combined signal includes power and data signals. However, it is appreciated that variations of the method 600 include obtaining the power and modulated data signals as separate, not combined signals.

The combined signal is decoupled into power and modulated data signals at block 606. A coupler/decoupler can be utilized to separate the signals from the combined signal. It is appreciated that this block is omitted if the signals are already separated.

The modulated data signal is demodulated at block 608 to obtain data. The demodulation uses the selected channel and modulation technique selected above. The data can include information can be obtained from automotive sensors, vibration sensors, temperature sensors, controllers, and the like. Further, the information can include control information, measurements, data, and the like. In one example, the information includes automotive measurements, such as tire vibration. Clock and data recovery may be performed.

The power signal is utilized for powering a component at block 610. The component can include a sensor, actuator, controller, and the like.

Figure 7:
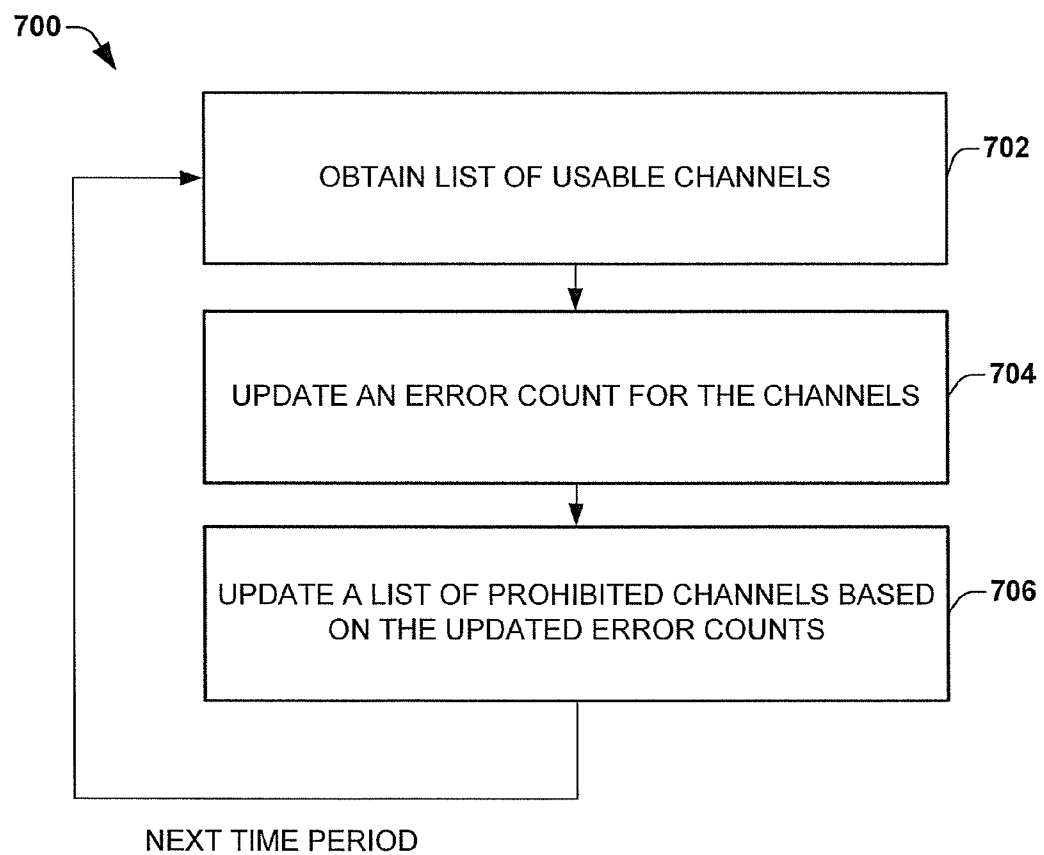
FIG. 7 is a flow diagram illustrating a method for identifying a suitable channel for data transfer.

FIG. 7 is a flow diagram illustrating a method 700 for detecting or identifying an unsuitable channel for data transfer. The method 700 analyzes data validity on received channels and may prohibit usage of some channels.

The method 700 begins at block 702, wherein a list of channels suitable for data transfer is obtained. The set S of channels suitable for data transfer have corresponding carrier frequencies designated as S={f1, f2, . . . , fn}.

An error count or similar characteristic for the channels in S is identified and/or updated at block 704. The characteristic, in one example, includes an error count per carrier frequency/channel and is designated C={c1, c2, . . . ci}, where T can include all possible frequencies. The error counters C are associated with invalid data received on channel 'ci'. Typically, a bus master or other component maintains the error count. At the end of a given time period $t_{sync}$, the master updates the relevant error counts based on received frames from other components on the bus, including sensor components. If there is an error with a received frame, the error count for the carrier frequency is incremented. If there is no error, the error count for the carrier frequency is decremented, limited to 0.

A list of prohibited channels is obtained and/or updated at block 706. Initially, the list of prohibited channels is zero and the list is designated by P. The prohibited channels have corresponding carrier frequencies designated as P={p1, p2, . . . , pm}. Channels having carrier frequencies with consecutive error counts above a threshold value e are removed from the list S and added to the list P.

It is appreciated that the number of available channels and carrier frequencies in S can decrease over time and result in none being available. This is referred to as "starvation".

Figure 8:
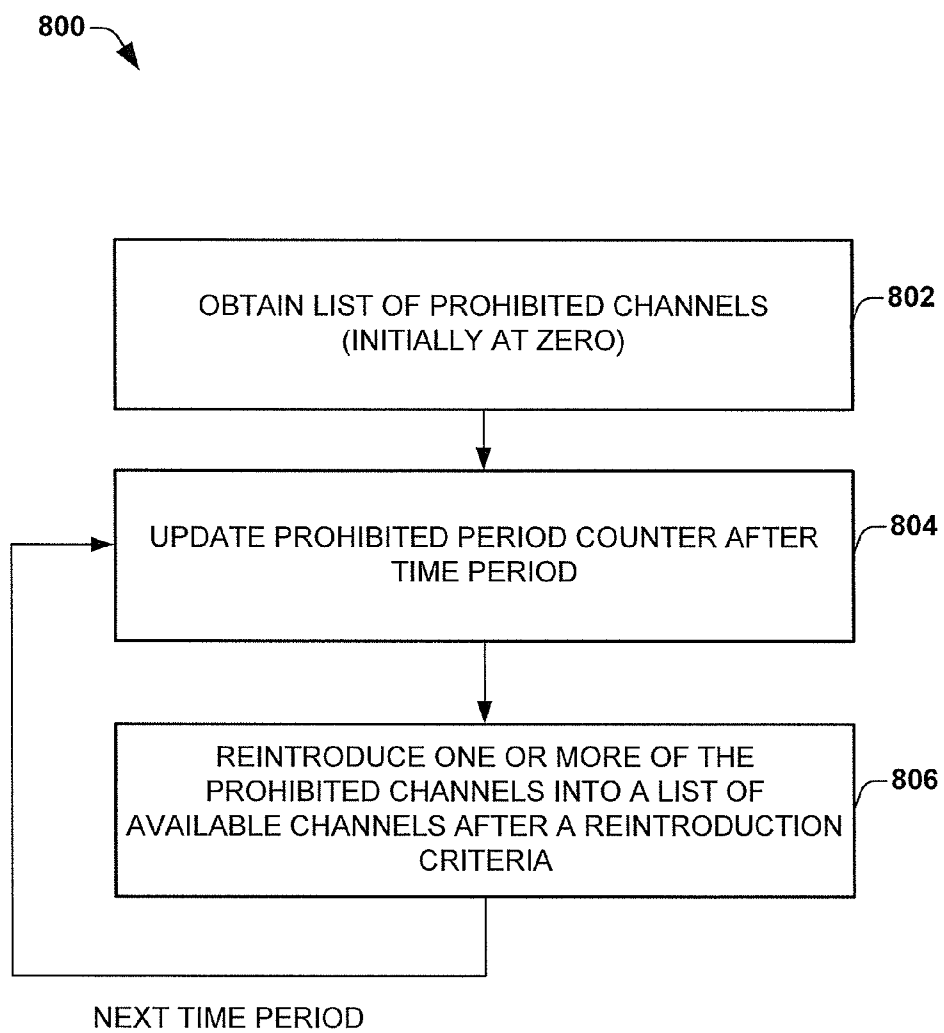
FIG. 8 is a flow diagram illustrating a method of removing channels from a list of prohibited channels.

FIG. 8 is a flow diagram illustrating a method 800 of moving channels from a list of prohibited channels to the list of channels suitable for data transfer. The method 800 can be utilized in conjunction with the method 700 to mitigate "starvation" of available channels.

The method 800 begins at block 802 wherein a list of prohibited channels P, as described above, has been created. The list of prohibited channels is initially at zero, but may increase over time.

A prohibited period counter for the prohibited channels is identified and/or updated after a given time period, $t_{sync}$, at block 804. The given time period is described as being the same time period used in the method 700, however it is appreciated that variation in the time period used in block 804 are permitted.

In one example, a bus master keeps a prohibited period counter for each of the channels in the prohibited list. The counter is incremented at every time period.

One or more of the prohibited channels are reintroduced to the list of available channels S at block 806 according to a reintroduction criteria. A variety of suitable reintroduction criteria can be used to identify channels to be added to the list of available channels S.

In one example, the prohibited channel is reintroduced to the list of available channels S after a random time period. The random time is doubled after consecutive failures. Thus, channels with consecutive failures can still be placed back in the list S, however, such channels must wait longer for reintroduction. Upon success, the random time is reset to an initial value.

Figure 9:
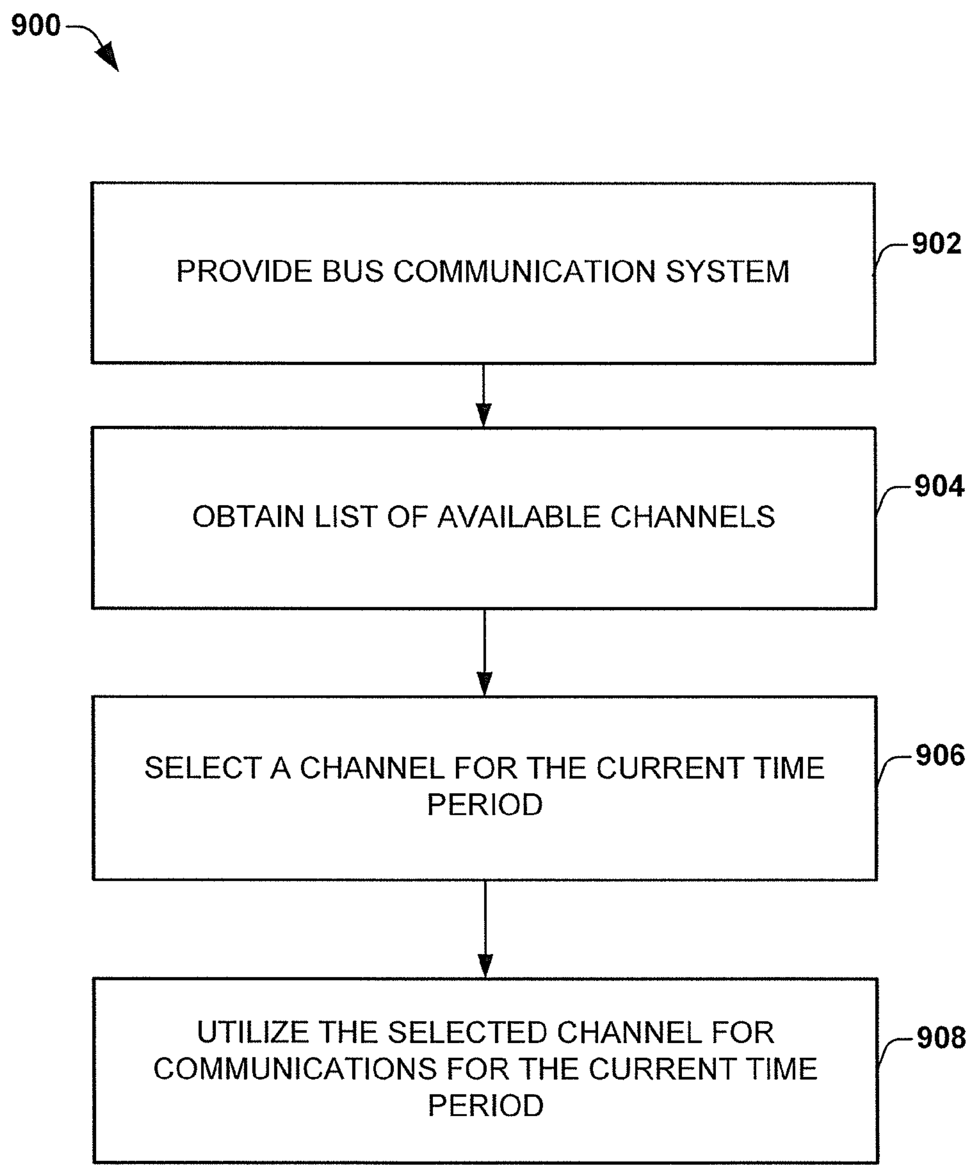
FIG. 9 is a flow diagram illustrating a method to adaptively select channels during communication.

FIG. 9 is a flow diagram illustrating a method 900 to adaptively select channels during communication. The method 900 pseudo-randomly chooses a channel from the set S of channels suitable for data transfer.

The method 900 begins at block 902, wherein a bus communication system is provided. The bus communication system can include one or more sensors, a bus master, and the like. The system utilizes modulated signals to transfer data and power using a single bus.

A list of available channels is obtained for a current time period at block 904. The list of channels S includes a number of channels and corresponding carrier frequencies, as described above with regards to FIG. 7. The list of channels can be maintained as shown and described in method 800, described above.

A channel of the list of channels is selected for the current time period at block 906. The selected channel is typically varied from a channel used in an immediately prior time period. In one example, the current channel is selected randomly.

Communications for the current time period are performed using the bus communications system and the current selected channel at block 908.

The method 900 can be repeated for subsequent time periods to facilitate communication.

It is appreciated that the methods of FIGS. 5, 6, 7, 8 and 9 and variations thereof can be combined and utilized interchangeably.

While the above methods are illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

It is appreciated that the claimed subject matter may be implemented as a method, apparatus, or article of manufacture using standard programming and/or engineering techniques to produce software, firmware, hardware, or any combination thereof to control a computer to implement the disclosed subject matter (e.g., the systems shown in FIGS. 1, 2, 3, etc., are non-limiting examples of system that may be used to implement methods). The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

A sensor system utilizing adaptively selected carrier frequencies is disclosed. The system includes a system bus, a bus master, and a sensor. The system bus is configured to transfer power and data. The bus master is coupled to the system bus and is configured to provide power to the bus and receive data from the bus. The sensor is coupled to the system bus and is configured to transfer data on the bus using an adaptively selected carrier frequency.

Another sensor system is disclosed. The system utilizes adaptively selected carrier frequencies and includes a system bus, a first component, and a modulation component. The system bus is configured to transfer power and data. The first component is configured to generate data. The modulation component is configured to modulate a modulated data signal from the generated data using an adaptively selected carrier frequency and a modulation technique and to provide the modulated data signal to the system bus.

A method of communicating over a system bus using an adaptively selected channel is disclosed. A selection mechanism is utilized to select a channel for data transfer from a list of available channels. Data is modulated using the selected channel to generate a modulated data signal. The modulated data signal is provided to a system bus.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A sensor system utilizing adaptively selected carrier frequencies, the system comprising:

a system bus configured to transfer power and data;

a bus master coupled to the system bus and configured to provide power to the bus and receive data from the bus;

a sensor coupled to the system bus and configured to transfer data on the bus using an adaptively selected carrier frequency; and a controller configured to select a carrier frequency from a list of available carrier frequencies based on a performance criteria and communicate the selected carrier frequency to the sensor, and subsequently select another carrier frequency from the list of available carrier frequencies based on a change in the performance criteria.

2. The system of claim 1, further comprising one or more additional sensors coupled to the system bus and configured to transfer data on the bus using the adaptively selected carrier frequency.

3. The system of claim 1, wherein the sensor is further configured to modulate the data using a modulation technique at the selected carrier frequency.

4. The system of claim 1, wherein the sensor is configured to receive power from the system bus.

5. The system of claim 1, wherein the bus master is configured to transfer master data to the bus using a second carrier frequency.

6. The system of claim 5, wherein the second carrier frequency is varied from the adaptively selected carrier frequency.

7. The system of claim 1, wherein the controller is configured to determine an error count associated with the adaptively selected carrier frequency as the performance criteria, and is further configured to select another carrier frequency from the list of available carriers frequencies if the error count exceeds a predetermined threshold.

8. The system of claim 1, wherein the bus master is configured to provide the power at a frequency varied from the adaptively selected carrier frequency.

9. The system of claim 1, wherein the transferred data includes automotive information.

10. A sensor system utilizing adaptively selected carrier frequencies, the system comprising:

a system bus configured to transfer power and data;

a first component configured to generate data;

a modulation component configured to generate a modulated data signal from the generated data of the first component using an adaptively selected carrier frequency, and to provide the modulated data signal to the system bus; and a controller configured to select a carrier frequency from a list of available carrier frequencies based on a performance criteria and communicate the selected carrier frequency to the modulation component, and subsequently select another carrier frequency from the list of available carrier frequencies based on a change in the performance criteria.

11. The system of claim 10, further comprising a coupling component configured to combine the modulated data signal with one or more additional signals and to provide a combined signal to the system bus.

12. The system of claim 10, further comprising a receiver configured to receive a second modulated data signal from the system bus, to demodulate the second modulated data signal into a received data signal, and to provide the received data signal to the first component.

13. The system of claim 1, wherein the performance criteria comprises a signal noise or distortion metric, and wherein the controller is configured to select a carrier frequency from a list of available carrier frequencies that have a signal noise or distortion metric that is below a predetermined threshold.

14. The system of claim 13, wherein the controller is further configured to select the carrier frequency from the list of available carrier frequencies using a pseudo-random selection process.

15. The system of claim 1, wherein the controller is configured to update the performance criteria and update the list of available carrier frequencies based on the updated performance criteria, and wherein the controller is further configured to subsequently select another carrier frequency from the updated list of available carrier frequencies.

* * * * *